United States Patent
Peng et al.

(10) Patent No.: US 11,817,788 B1
(45) Date of Patent: Nov. 14, 2023

(54) VOLTAGE CONVERTER AND CONTROL METHOD FOR VOLTAGE CONVERSION

(71) Applicant: Chicony Power Technology Co., Ltd., New Taipei (TW)

(72) Inventors: Tso-Jen Peng, New Taipei (TW); Ssu-Hao Wang, New Taipei (TW); Mao-Song Pan, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/869,897

(22) Filed: Jul. 21, 2022

(30) Foreign Application Priority Data

Jun. 9, 2022 (TW) .................................. 111121527

(51) Int. Cl.
*H02M 3/335* (2006.01)
*H02M 3/155* (2006.01)

(52) U.S. Cl.
CPC ....... *H02M 3/33571* (2021.05); *H02M 3/155* (2013.01); *H02M 3/33507* (2013.01); *H02M 3/33569* (2013.01); *H02M 3/33576* (2013.01)

(58) Field of Classification Search
CPC ............. H02M 3/33571; H02M 3/155; H02M 3/33507; H02M 3/33569; H02M 3/33576
See application file for complete search history.

(56) References Cited

U.S. PATENT DOCUMENTS

| | | | | |
|---|---|---|---|---|
| 8,488,340 B2 * | 7/2013 | Zhang | ................. | H02M 3/3376 363/21.07 |
| 8,749,212 B2 | 6/2014 | Saint-Pierre | | |
| 9,601,990 B2 * | 3/2017 | Jin | ..................... | H02M 3/33592 |
| 10,389,233 B1 * | 8/2019 | Lim | ..................... | H02M 1/4266 |
| 11,336,173 B1 * | 5/2022 | Peng | ....................... | H02M 3/01 |
| 11,411,504 B1 * | 8/2022 | Peng | ................. | H02M 3/33569 |
| 2005/0174813 A1 * | 8/2005 | Dou | ................. | H02M 3/33592 363/59 |

(Continued)

FOREIGN PATENT DOCUMENTS

| CN | 104467443 | 3/2015 |
|---|---|---|
| CN | 108258910 | 7/2018 |

(Continued)

*Primary Examiner* — Yusef A Ahmed
(74) *Attorney, Agent, or Firm* — Andrew M. Calderon; Calderon Safran & Cole P.C.

(57) ABSTRACT

A voltage converter includes a feedback controller, a primary-side controller, a secondary-side controller, a primary-side rectification-filtration circuit, a boost converter, and a voltage conversion circuit. The feedback controller receives a voltage demand signal from an output end to output a first feedback signal and a second feedback signal. The primary-side controller generates a boost control signal and a first switching control signal according to the first feedback signal. The secondary-side controller generates a second switching control signal according to the second feedback signal. The boost converter is configured to boost a DC voltage outputted by the primary-side rectification-filtration circuit into a first voltage according to the boost control signal. The operation mode of the voltage conversion circuit is switched between a half-bridge rectification mode and a full-bridge rectification mode according to the first and second switching control signals. A method for voltage conversion is also provided.

18 Claims, 8 Drawing Sheets

(56) References Cited

U.S. PATENT DOCUMENTS

| | | | |
|---|---|---|---|
| 2006/0133119 A1 | 6/2006 | Nomura et al. | |
| 2008/0123374 A1* | 5/2008 | Vinciarelli | H02M 7/10 363/65 |
| 2010/0237793 A1* | 9/2010 | Hasegawa | H05B 41/388 315/224 |
| 2011/0025289 A1* | 2/2011 | Wang | H02M 3/3387 323/285 |
| 2012/0236612 A1* | 9/2012 | Uno | H02M 1/36 363/126 |
| 2013/0334893 A1* | 12/2013 | Takahashi | H04B 5/0075 307/104 |
| 2013/0336016 A1* | 12/2013 | Shiji | H02M 3/3376 363/21.02 |
| 2014/0084862 A1* | 3/2014 | Kawaguchi | B60L 53/65 320/108 |
| 2014/0160805 A1* | 6/2014 | Oh | H02M 1/4258 363/21.02 |
| 2014/0211515 A1* | 7/2014 | Tomioka | H02M 3/01 363/21.02 |
| 2014/0253017 A1* | 9/2014 | Kominami | H02J 7/02 320/103 |
| 2015/0098254 A1* | 4/2015 | Brinlee | H02M 3/3376 363/21.02 |
| 2015/0162840 A1 | 6/2015 | Frost et al. | |
| 2015/0180353 A1* | 6/2015 | Tsai | H02M 3/33515 363/21.01 |
| 2016/0016479 A1* | 1/2016 | Khaligh | H01F 38/08 336/170 |
| 2018/0278149 A1* | 9/2018 | Sano | H02M 1/4225 |
| 2019/0165685 A1* | 5/2019 | Lind | H02M 1/4258 |
| 2019/0267886 A1* | 8/2019 | Hung | H02M 3/33507 |
| 2020/0076315 A1* | 3/2020 | Peng | H02M 3/33576 |
| 2022/0109373 A1* | 4/2022 | Fu | H02M 1/0085 |
| 2022/0194239 A1* | 6/2022 | Zhu | H02J 7/02 |

FOREIGN PATENT DOCUMENTS

| | | |
|---|---|---|
| CN | 110504847 | 11/2019 |
| CN | 113394979 A | 9/2021 |
| CN | 113452260 | 9/2021 |
| TW | 201010506 A | 3/2010 |
| TW | 201027892 | 7/2010 |
| TW | 201535930 A | 9/2015 |

\* cited by examiner

VOLTAGE CONVERTER AND CONTROL METHOD FOR VOLTAGE CONVERSION

CROSS-REFERENCE TO RELATED APPLICATION

This non-provisional application claims priority under 35 U.S.C. § 119(a) to Patent Application No. 111121527 filed in Taiwan, R.O.C. on Jun. 9, 2022, the entire contents of which are hereby incorporated by reference.

BACKGROUND

TECHNICAL FIELD

The instant disclosure is related to a voltage converter, especially a voltage converter capable of flexibly adjusting output voltage value according to the demand voltage of an electronic device.

RELATED ART

In applications where the input power is above 75 W, boost converters are usually used to increase the power factor and to maintain the output voltage at a fixed high voltage with a variety of input voltages. In addition, the fixed output voltage provides a good condition for a next-stage LLC resonance converter, so that the LLC resonance converter can be designed with a gain that is optimal for the efficiency.

However, as power delivery (PD) devices are more widely used, it is often needed to adopt variable output voltages in an LLC resonance converter structure known to the inventor. As a result, how to balance between gain and efficiency is an important topic in the design of the LLC resonance converter.

SUMMARY

In view of the above, an embodiment of the instant disclosure provides a voltage converter comprising a feedback controller, a primary side controller, a secondary side controller, a primary side rectification filtration circuit, a boost converter, and a voltage conversion circuit. The feedback controller is configured to receive a voltage demand signal from an output end so as to output a first feedback signal and a second feedback signal according to the voltage demand signal. The primary side controller is coupled to the feedback controller, and the primary side controller is configured to generate a boost control signal and a first switching control signal according to the first feedback signal. The secondary side controller is coupled to the feedback controller, and the secondary side controller is configured to generate a second switching control signal according to the second feedback signal. The primary side rectification filtration circuit is configured to receive an AC voltage and rectify the AC voltage into a DC voltage. The boost converter is coupled to the primary side rectification filtration circuit and the primary side controller, and the boost converter is configured to boost the DC voltage into a first voltage according to the boost control signal. The voltage conversion circuit is coupled to the boost converter, the primary side controller, and the secondary side controller, so that an operation mode of the voltage conversion circuit is switched between a half-bridge rectification mode and a full-bridge rectification mode according to the first switching control signal and the second switching control signal, and thus the voltage conversion circuit converts the first voltage into a second voltage in the half-bridge rectification mode or converts the first voltage into a third voltage in the full-bridge rectification mode. The voltage conversion circuit then outputs the second voltage or the third voltage through the output end.

An embodiment of the instant disclosure provides a control method for voltage conversion comprising: detecting a voltage demand signal of an electronic device; generating a boost control signal, a first switching control signal, and a second switching control signal according to the voltage demand signal; controlling a first voltage outputted by a boost converter according to the boost control signal, wherein the first voltage is outputted to a voltage conversion circuit; and switching an operation mode of the voltage conversion circuit between a half-bridge rectification mode and a full-bridge rectification mode according to the first switching control signal and the second switching control signal, and controlling the voltage conversion circuit to operate, so that the first voltage is converted into a second voltage in the half-bridge rectification mode, and the first voltage is converted into a third voltage in the full-bridge rectification mode.

As above, according to some exemplary embodiments of the instant disclosure, the voltage converter and the control method for voltage conversion are able to control the first voltage outputted by the boost converter according to the demand voltage of the electronic device, and the voltage converter and the control method for voltage conversion are able to switch the operation mode of the secondary side circuit of the voltage conversion circuit between the half-bridge rectification mode and the full-bridge rectification mode, so that the first voltage is converted into the second voltage or the third voltage. When the demand voltage is larger, through the high gain of the full-bridge rectification mode, the output voltage of the forestage boost converter is not needed to be boosted too much. Furthermore, the output voltage can be adjusted by switching the operation mode of the primary side circuit of the voltage conversion circuit between a half-bridge resonance mode and a full-bridge resonance mode. As a result, variability of the output voltage can be achieved through simple control. At the same time, because basic circuit structures are adopted in the design of the voltage converter, large-scale circuitry modification is not needed for specific applications, the cost of possible modifications is low, and it is beneficial for miniaturization of relative products.

BRIEF DESCRIPTION OF THE DRAWINGS

The disclosure will become more fully understood from the detailed description given herein below for illustration only, and thus not limitative of the disclosure, wherein.

DETAILED DESCRIPTION

The term "couple" in the instant disclosure refers to that two or more elements directly, and physically or electrically, contact each other, or that two or more elements indirectly, and physically or electrically, contact each other, or it may also refer to that two or more elements operate relatively to each other. The terms "first", "second", etc. in the instant disclosure are just used to differentiate different elements from one another and not to sequence or limit the individual elements, and also not to limit the instant disclosure.

Figure 1:
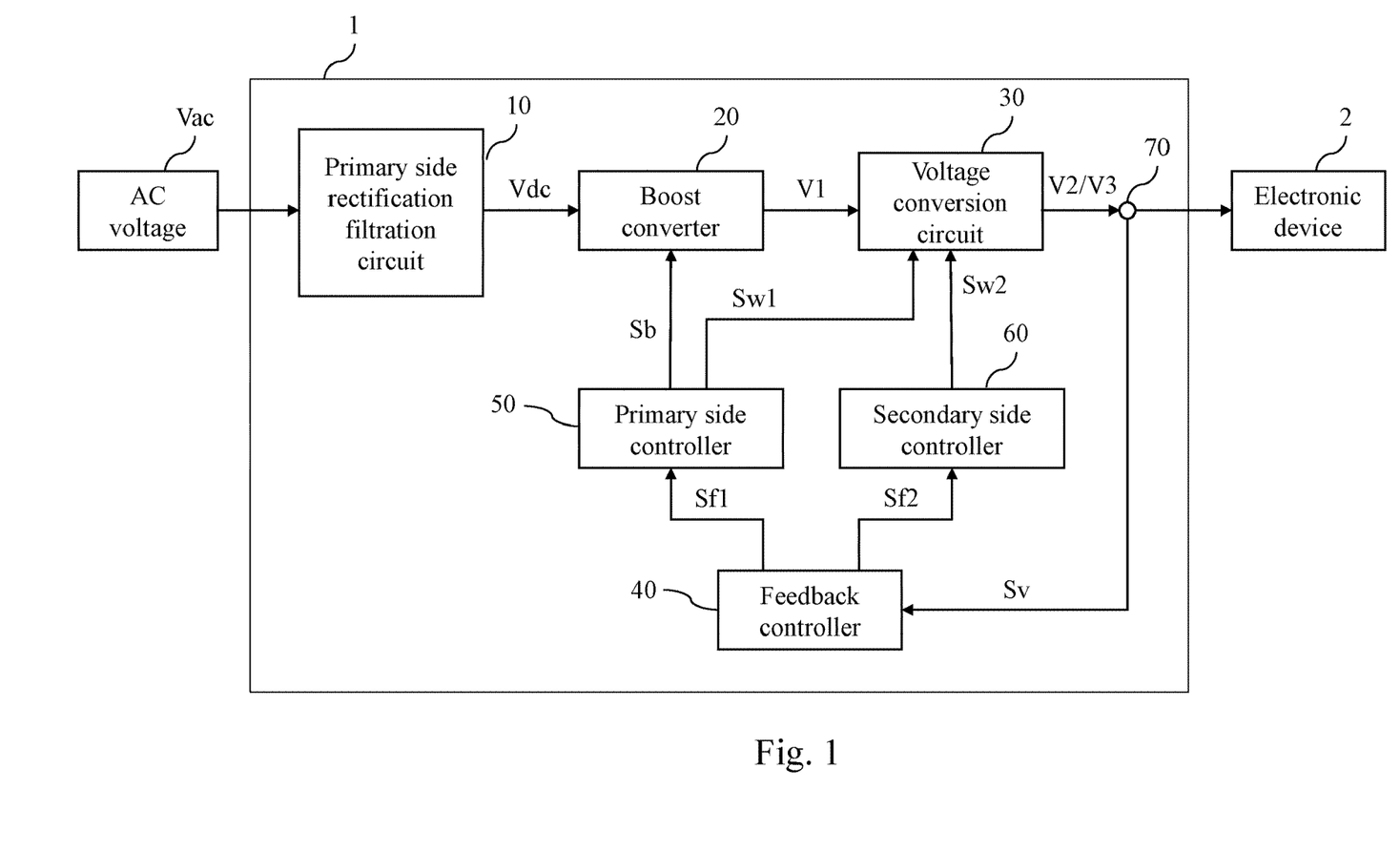
FIG. 1 illustrates a schematic diagram of a voltage converter and an electronic device according to an exemplary embodiment of the instant disclosure.

Please refer to FIG. 1. FIG. 1 illustrates a schematic diagram of a voltage converter 1 and an electronic device 2 according to an exemplary embodiment of the instant disclosure. The voltage converter 1 is configured to convert an AC voltage signal into a DC voltage signal for the electronic device 2. The voltage converter 1 may be, but not limited to, a power adapter which conforms to the power delivery standard of universal serial bus (USB). The electronic device 2 may be, but not limited to, a notebook computer, a hard drive, a smart phone, or other electronic devices that need power supply.

The voltage converter 1 comprises a primary side rectification filtration circuit 10, a boost converter 20, a voltage conversion circuit 30, a feedback controller 40, a primary side controller 50, a secondary side controller 60, and an output end 70. The primary side rectification filtration circuit 10, the boost converter 20, the voltage conversion circuit 30, and the output end 70 are sequentially coupled to one another. The primary side rectification filtration circuit 10 is configured to receive an AC voltage Vac and rectify the AC voltage Vac into a DC voltage Vdc. The feedback controller 40 is coupled to the output end 70 so as to receive a voltage demand signal Sv sent by the electronic device 2. The output end 70 is a power output connector, such as a type-C connector, but the instant disclosure is not limited thereto. The feedback controller 40 is configured to acquire a demand voltage value of the electronic device 2 according to the voltage demand signal Sv so as to output a first feedback signal Sf1 and a second feedback signal Sf2 according to the voltage demand signal Sv.

The primary side controller 50 is coupled to the feedback controller 20, the voltage conversion circuit 30, and the feedback controller 40, and the primary side controller 50 is configured to generate a boost control signal Sb and a first switching control signal Sw1 according to the first feedback signal Sf1. The secondary side controller 60 is coupled to the voltage conversion circuit 30 and the feedback controller 40, and the secondary side controller 60 is configured to generate a second switching control signal Sw2 according to the second feedback signal Sf2.

Through the first feedback signal Sf1 and the second feedback signal Sf2, the boost converter 20 and the voltage conversion circuit 30 are controlled, so that the output end 70 can output a voltage signal which conforms to the voltage demand signal Sv. Specifically, in this embodiment, the boost converter 20 is coupled to the primary side rectification filtration circuit 10, the voltage conversion circuit 30, and the primary side controller 50, so as to boost the DC voltage Vdc into a first voltage V1 according to the boost control signal Sb. The voltage conversion circuit 30 is coupled to the boost converter 20, the primary side controller 30, and the secondary side controller 60, and an operation mode of the voltage conversion circuit 30 is switched between a half-bridge rectification mode and a full-bridge rectification mode according to the first switching control signal Sw1 and the second switching control signal Sw2. When the voltage conversion circuit 30 is in the half-bridge rectification mode, the voltage conversion circuit 30 converts the first voltage V1 into the second voltage V2 and then outputs the second voltage V2 through the output end 70. When the voltage conversion circuit 30 is in the full-bridge rectification mode, the voltage conversion circuit 30 converts the first voltage V1 into the third voltage V3 and then outputs the third voltage V3 through the output end 70. In this embodiment, an amplitude of the third voltage V3 is twice an amplitude of the second voltage V2.

Figure 2:
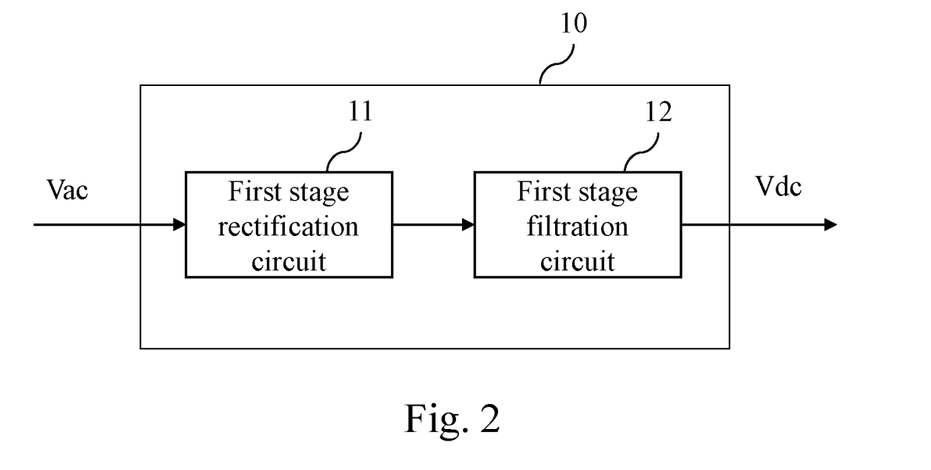
FIG. 2 illustrates a schematic diagram of a primary side rectification filtration circuit according to an exemplary embodiment of the instant disclosure.

Please refer to FIG. 2. FIG. 2 illustrates a schematic diagram of the primary side rectification filtration circuit 10 according to an exemplary embodiment of the instant disclosure. The primary side rectification filtration circuit 10 comprises a first stage rectification circuit 11 and a first stage filtration circuit 12. The first stage rectification circuit 11 rectifies the AC voltage Vac, and the rectified AC voltage is then filtered by the first stage filtration circuit 11 so as to obtain the DC voltage Vdc. In some exemplary embodiments, the first stage rectification circuit 11 may be a diode bridge. In some exemplary embodiments, the first stage filtration circuit 12 may comprise a filtration capacitor so as to smooth the DC output.

Figure 3:
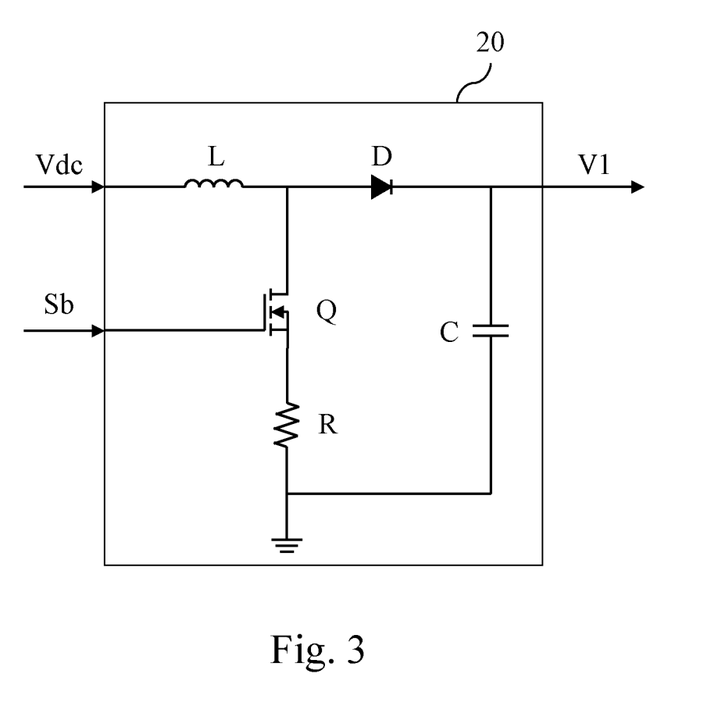
FIG. 3 illustrates a schematic diagram of a boost converter according to an exemplary embodiment of the instant disclosure.

Please refer to FIG. 3. FIG. 3 illustrates a schematic diagram of the boost converter 20 according to an exemplary embodiment of the instant disclosure. In this embodiment, the boost converter 20 is a power factor correction (PFC) circuit, but the instant disclosure is not limited thereto, and other types of boost converters may be selected as well. The boost converter 20 comprises a boost inductor L, a boost diode D, a boost switch Q, a grounding resistor R, and an output capacitor C. A first end of the boost inductor L is coupled to the primary side rectification filtration circuit 10 so as to receive the DC voltage Vdc. An anode of the boost diode D is coupled to a second end of the boost inductor L. A cathode of the boost diode D serves as the output end of the boost converter 20 so as to output the first voltage V1. One of two ends of the boost switch Q is coupled to the second end of the boost inductor L and the anode of the boost diode D, and the other end of the boost switch Q is coupled to the grounding resistor R. One of two ends of the output capacitor C is coupled to a grounded end of the grounding resistor R, and the other end of the output capacitor C is coupled to the cathode of the boost diode D. A control end of the boost switch Q is coupled to the primary side controller 50 so as to receive the boost control signal Sb, and thus the boost switch Q can be turned on or turned off. When the boost switch Q is turned on, a current travels through the boost inductor L, the boost switch Q, the grounding resistor R, and to a ground, so that the boost inductor L is charged. When the boost switch Q is turned off, the current travels from the boost inductor L, through the boost diode D, and to the output capacitor C, so that the output capacitor C is charged. Consequently, according to one or some embodiments of the instant disclosure, the voltage value of the first voltage V1 is controlled through the switching frequency between on and off of the boost switch Q.

Figure 4:
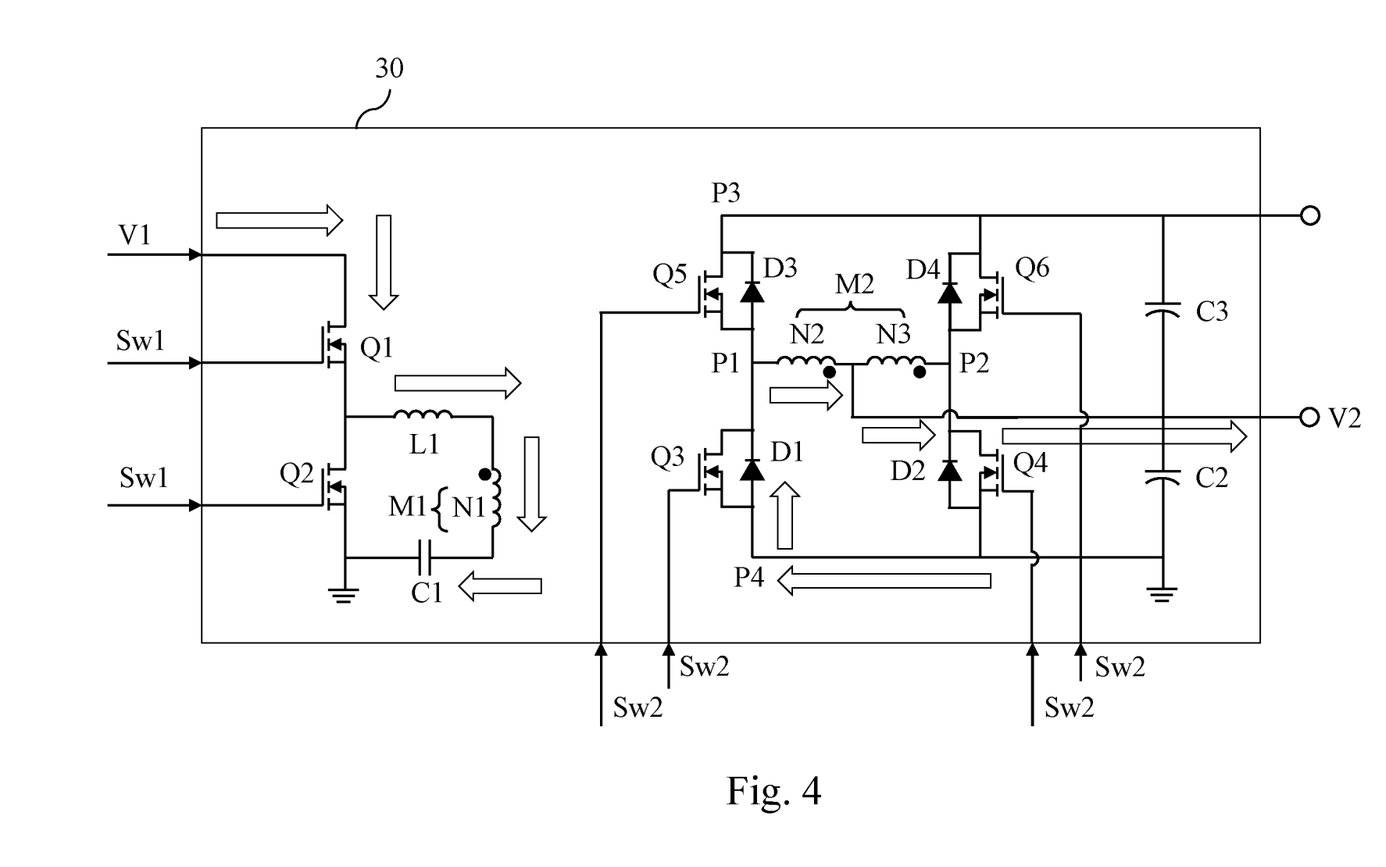
FIG. 4 illustrates a schematic diagram (1) of a voltage conversion circuit according to an exemplary embodiment of the instant disclosure.

Please refer to FIG. 4. FIG. 4 illustrates a schematic diagram (1) of the voltage conversion circuit 30 according to an exemplary embodiment of the instant disclosure. In this embodiment, the voltage conversion circuit 30 is an LLC converter. In this exemplary embodiment, the voltage conversion circuit 30 is divided into a primary side circuit and a secondary side circuit by a primary winding M1 and a secondary winding M2 of a transformer.

The primary side circuit comprises a first switch Q1, a second switch Q2, an inductor L1, and a first capacitor C1. The first switch Q1 and the second switch Q2 are connected to each other in series. The first switch Q1 is coupled to the boost converter 20 so as to receive the first voltage V1. One of two ends of the inductor L1 is coupled between the first switch Q1 and the second switch Q2, and the other end of the inductor L1 is coupled to a first end of a coil N1 of the primary winding M1. One of two ends of the first capacitor C1 is coupled to the second switch Q2 and the ground, and the other end of the first capacitor C1 is coupled to a second end of the coil N1 of the primary winding M1. The control end of first switch Q1 and the control end of the second switch Q2 are coupled to the primary side controller 50 so as to receive the first switching control signal Sw1. In this exemplary embodiment, the first switching control signal Sw1 received by the first switch Q1 and the first switching control signal Sw1 received by the second switch Q2 are transmitted through different paths, so that the first switch Q1 and the second switch Q2 are independently controlled.

The secondary side circuit comprises a bridge rectifier, a third switch Q3, a fourth switch Q4, a fifth switch Q5, and a sixth switch Q6, where in this embodiment, the bridge rectifier is formed by four diodes D1-D4. The four diodes D1-D4 are sequentially connected to each other in series so as to form a closed path. Specifically, in this exemplary embodiment, the anode of the diode D1 is coupled to the anode of the diode D2, and the cathode of the diode D3 is coupled to the cathode of the diode D4. The cathode of the diode D1 is coupled to the anode of the diode D3, and the coupling point between the diode D1 and the diode D3 is an input node P1. The cathode of the diode D2 is coupled to the anode of the diode D4, and the coupling point between the diode D2 and the diode D4 is an input node P2. The bridge rectifier is divided into an upper half-bridge path and a lower half-bridge path by the input nodes P1, P2. The two diodes D1, D2 on the lower half-bridge path are connected to the third switch Q3 and the fourth switch Q4 in parallel, respectively (in other words, in this embodiment, the diode D1 is connected to the third switch Q3 in parallel, and the diode D2 is connected to the fourth switch D3 in parallel), and the two the diodes D3, D4 on the upper half-bridge path are connected to the fifth switch Q5 and the sixth switch Q6 in parallel, respectively (in other words, in this embodiment, the diode D3 is connected to the fifth switch Q5 in parallel, and the diode D4 is connected to the sixth switch Q6 in parallel). The secondary winding M2 is coupled between the two input nodes P1, P2. The secondary winding M2 comprises a central tap, and the secondary winding M2 is divided into a first coil N2 and a second coil N3 by the central tap. The control end of the third switch Q3, the control end of the fourth switch Q4, the control end of the fifth switch Q5, and the control end of the sixth switch Q6 are coupled to the secondary side controller 60 so as to receive the second switching control signal Sw2. In this exemplary embodiment, the second switching control signal Sw2 received by the third switch Q3, the second switching control signal Sw2 received by the fourth switch Q4, the second switching control signal Sw2 received by the fifth switch Q5, and the second switching control signal Sw2 received by the sixth switch Q6 are transmitted through different paths, so that the third switch Q3, the fourth switch Q4, the fifth switch Q5, and the sixth switch Q6 are independently controlled.

The arrows shown in FIG. 4 indicate current paths and directions of a positive half cycle current in the half-bridge rectification mode. In the half-bridge rectification mode, the second voltage V2 is outputted through the central tap. The secondary side circuit further comprises two filtration capacitors C2, C3 connected to each other in series and coupled between two output nodes P3, P4 of the bridge rectifier. The output node P3 is between the diodes D3, D4, and the output node P4 is between the diodes D1, D2. The central tap is coupled between the filtration capacitors C2, C3. According to the first switching control signal Sw1 and the second switching control signal Sw2, the fifth switch Q5 and the sixth switch Q6 are turned off, the first switch Q1 and the third switch Q3 are turned on, and the second switch Q2 and the fourth switch Q4 are turned off. As a result, the positive half cycle current in the primary side circuit travels sequentially through the first switch Q1, the inductor L1, the coil N1, and the first capacitor C1, and thus the positive half cycle current charges the first capacitor C1. The positive half cycle current in the secondary side circuit travels sequentially through the third switch Q3 and the first coil N2, and thus the filtration capacitor C2 is charged by the positive half cycle current.

Figure 5:
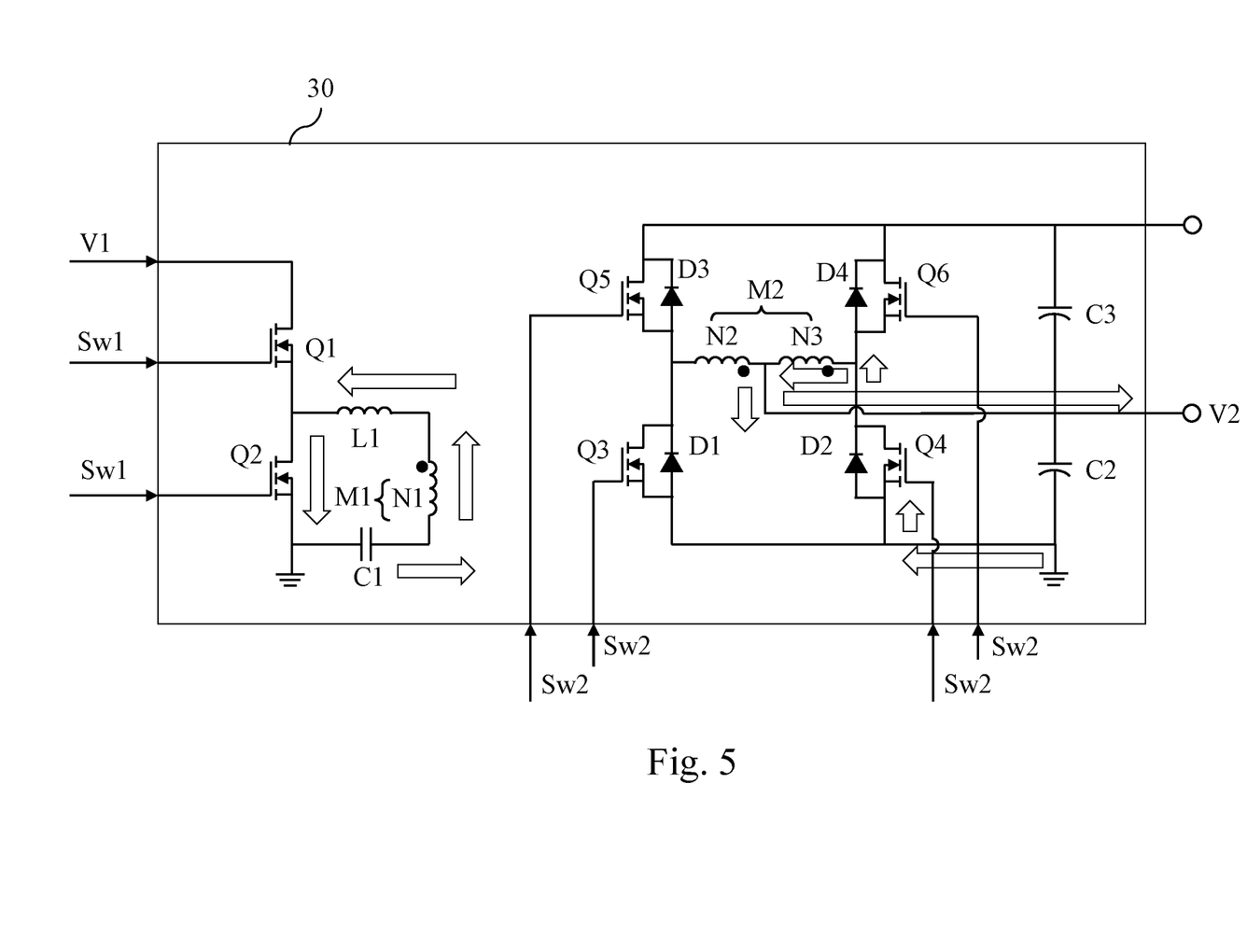
FIG. 5 illustrates a schematic diagram (2) of a voltage conversion circuit according to an exemplary embodiment of the instant disclosure.

Please refer to FIG. 5. FIG. 5 illustrates a schematic diagram (2) of the voltage conversion circuit 30 according to an exemplary embodiment of the instant disclosure. The arrows shown in FIG. 5 indicate current paths and directions of a negative half cycle current in the half-bridge rectification mode. In the half-bridge rectification mode, according to the first switching control signal Sw1 and the second switching control signal Sw2, the fifth switch Q5 and the sixth switch Q6 are turned off, the second switch Q2 and the fourth switch Q4 are turned on, and the first switch Q1 and the third switch Q3 are turned off. As a result, the negative half cycle current in the primary side circuit discharges the first capacitor C1 and travels sequentially through the coil N1, the inductor L1, and the second switch Q2. The negative half cycle current in the secondary side circuit travels sequentially through the fourth switch Q4 and the second coil N3, and thus the filtration capacitor C2 is charged by the negative half cycle current in the secondary side circuit.

For example, when a demand voltage corresponding to the voltage demand signal Sv is 20 V, the feedback controller 40 instructs the primary side controller 50 through the first feedback signal Sf1 to set the voltage output (the first voltage V1) of the boost converter 20 at 400 V. Let a turns ratio N of the primary winding M1 to the secondary winding M2 be 10 (N=10). Consequently, according to a half-bridge LLC gain formula: gain M=2NVo/Vin=1 (where Vin denotes an input voltage and is equal to 400 V in this example, and Vo denotes an output voltage), the outputted second voltage V2 is 20 V. If the demand voltage is 24 V, the same formula can be applied, so that the output voltage of the boost converter 20 is set at 480 V. In other words, in this embodiment, by adjusting the output voltage (the first voltage V1)

of the boost converter 20 while retaining the rectification mode of the voltage conversion circuit 30, slight adjustment of the output voltage of the voltage conversion circuit 30 can be achieved.

Figure 6:
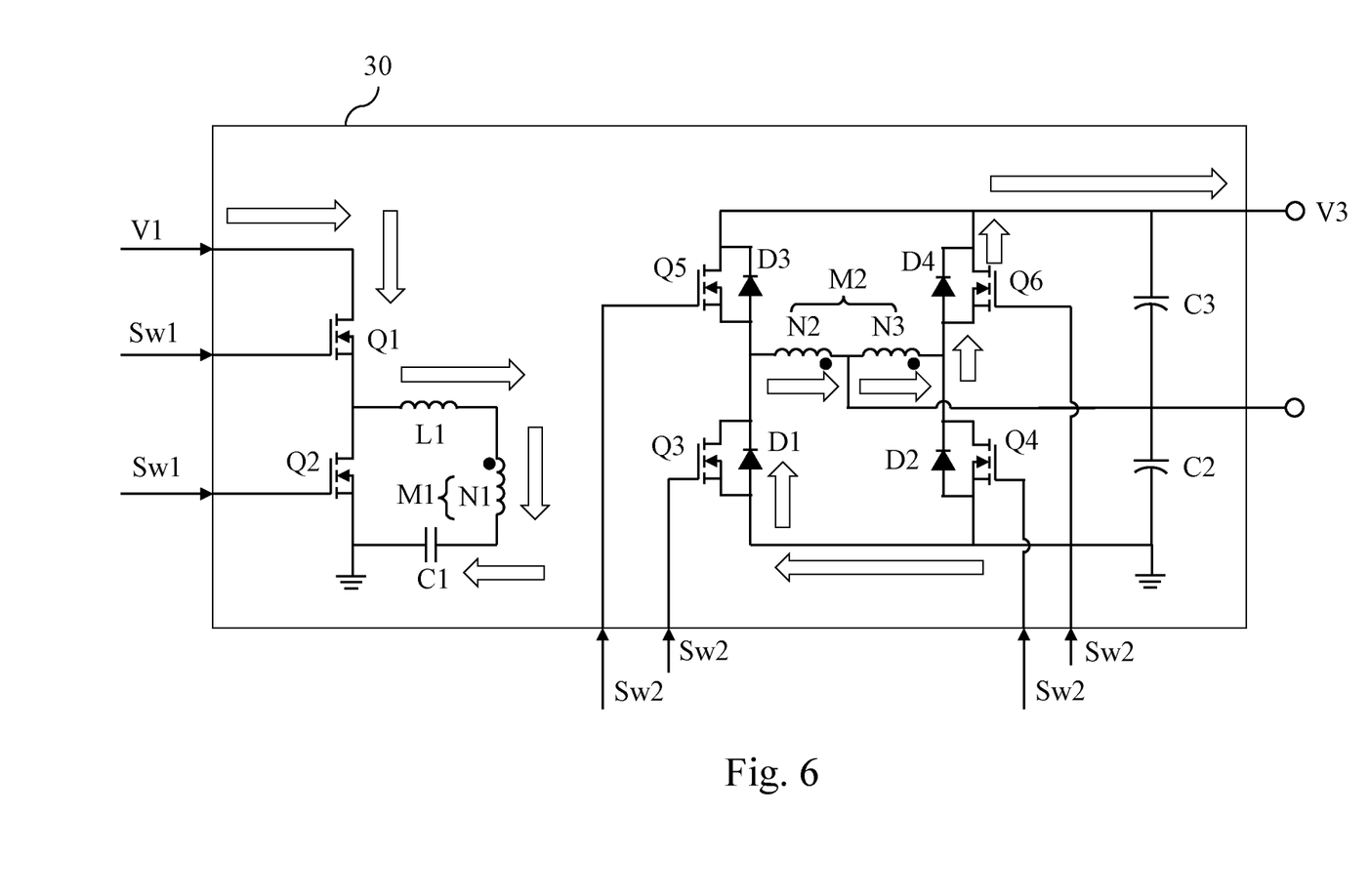
FIG. 6 illustrates a schematic diagram (3) of a voltage conversion circuit according to an exemplary embodiment of the instant disclosure.

Please refer to FIG. 6. FIG. 6 illustrates a schematic diagram (3) of the voltage conversion circuit 30 according to an exemplary embodiment of the instant disclosure. The arrows shown in FIG. 6 indicate current paths and directions of the positive half cycle current in the full-bridge rectification mode. The positive half cycle current in the primary side circuit in the full-bridge rectification mode is identical to the positive half cycle current in the primary side circuit in the half-bridge rectification mode shown in FIG. 4 and thus will not be repeated here. According to the first switching control signal Sw1 and the second switching control signal Sw2, the fifth the first switch Q1, the third switch Q3, and the sixth switch Q6 are turned on, and the second switch Q2, the fourth switch Q4, and the fifth switch Q5 are turned off. As a result, the positive half cycle current in the secondary side circuit travels sequentially through the third switch Q3, the first coil N2, the second coil N3, and the sixth switch Q6, and thus the filtration capacitors C2, C3 are charged by the positive half cycle current in the secondary side circuit.

Figure 7:
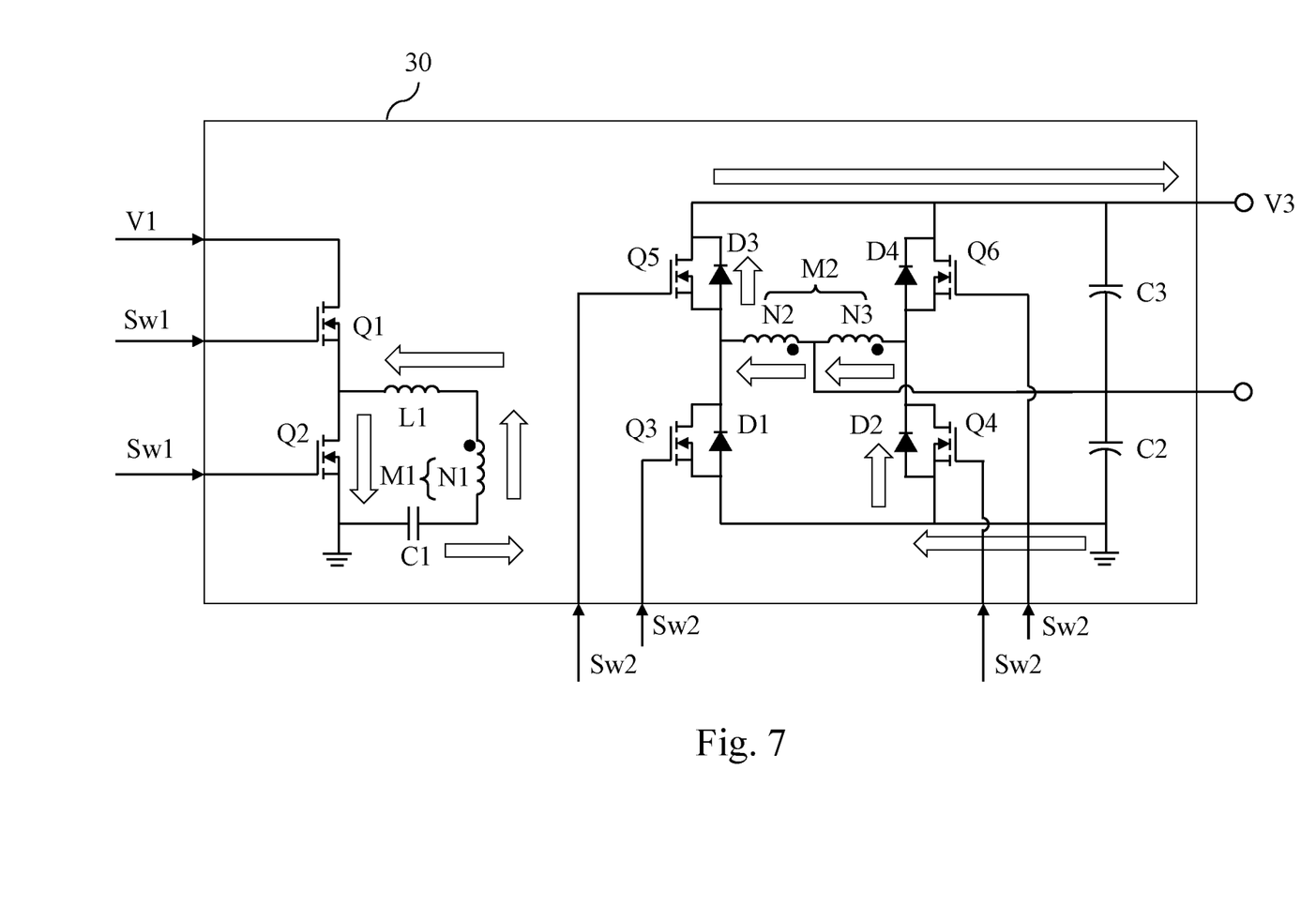
FIG. 7 illustrates a schematic diagram (4) of a voltage conversion circuit according to an exemplary embodiment of the instant disclosure.

Please refer to FIG. 7. FIG. 7 illustrates a schematic diagram (4) of the voltage conversion circuit 30 according to an exemplary embodiment of the instant disclosure. The arrows shown in FIG. 7 indicate current paths and directions of the negative half cycle current in the full-bridge rectification mode. The negative half cycle current in the primary side circuit in the full-bridge rectification mode is identical to the negative half cycle current in the primary side circuit in the half-bridge rectification mode shown in FIGS. 5 and thus will not be repeated here. According to the first switching control signal Sw1 and the second switching control signal Sw2, the fifth the first switch Q1, the third switch Q3, and the sixth switch Q6 are turned off, and the second switch Q2, the fourth switch Q4, and the fifth switch Q5 are turned on. As a result, the negative half cycle current in the secondary side circuit travels sequentially through the fourth switch Q4, the second coil N3, the first coil N2, and the fifth switch Q5, and thus the filtration capacitors C2, C3 are charged by the negative half cycle current in the secondary side circuit.

According to some embodiments of the instant disclosure, with the above illustration, it can be seen that, in the half-bridge rectification mode, some of the switches (the fifth switch Q5 and the sixth switch Q6) on the secondary side circuit are turned off, and the current only travels through a part of the coil turns of the secondary winding M2. That it, in these embodiments, the positive half cycle current travels through the first coil N2, and the negative half cycle current travels through the second coil N3. In the full-bridge rectification mode, both the positive half cycle current and the negative half cycle current travel through the first coil N2 and the second coil N3. In other words, in these embodiments, a number of coil turnsthrough which current travels in the secondary side circuit in the full-bridge rectification mode is twice the number of coil turns through which current travels in the secondary side circuit in the half-bridge rectification mode, and thus the output voltage in the full-bridge rectification mode is twice the output voltage in the half-bridge rectification mode. That is, the voltage value of the third voltage V3 is twice the voltage value of the second voltage V2.

For example, when the demand voltage corresponding to the voltage demand signal Sv is 40 V, according to the half-bridge gain formula mentioned above, the voltage output (the first voltage V1) of the boost converter 20 has to be increased to 800 V. In order to avoid boosting the output voltage of the boost converter 20 too much, the operation mode of the voltage converter circuit 30 can be switched to the full-bridge rectification mode. As a result, because the gain is doubled on the secondary side, the voltage output (the first voltage V1) of the boost converter 20 can be set at 400 V. In other words, in this embodiment, by switching the operation mode of the voltage conversion circuit 30 to the full-bridge rectification mode, the output voltage of the voltage conversion circuit 30 can be doubled. Furthermore, beside that the operation mode of the voltage conversion circuit 30 can be switched to the full-bridge rectification mode, the output voltage (the first voltage V1) of the boost converter 20 can also be adjusted, so that the overall output voltage can be flexibly adjusted. For example, if the demand voltage is 48 V, the output voltage of the boost converter 20 can be set at 480 V, and the operation mode of the voltage conversion circuit 30 can be switched to the full-bridge rectification mode.

Figure 8:
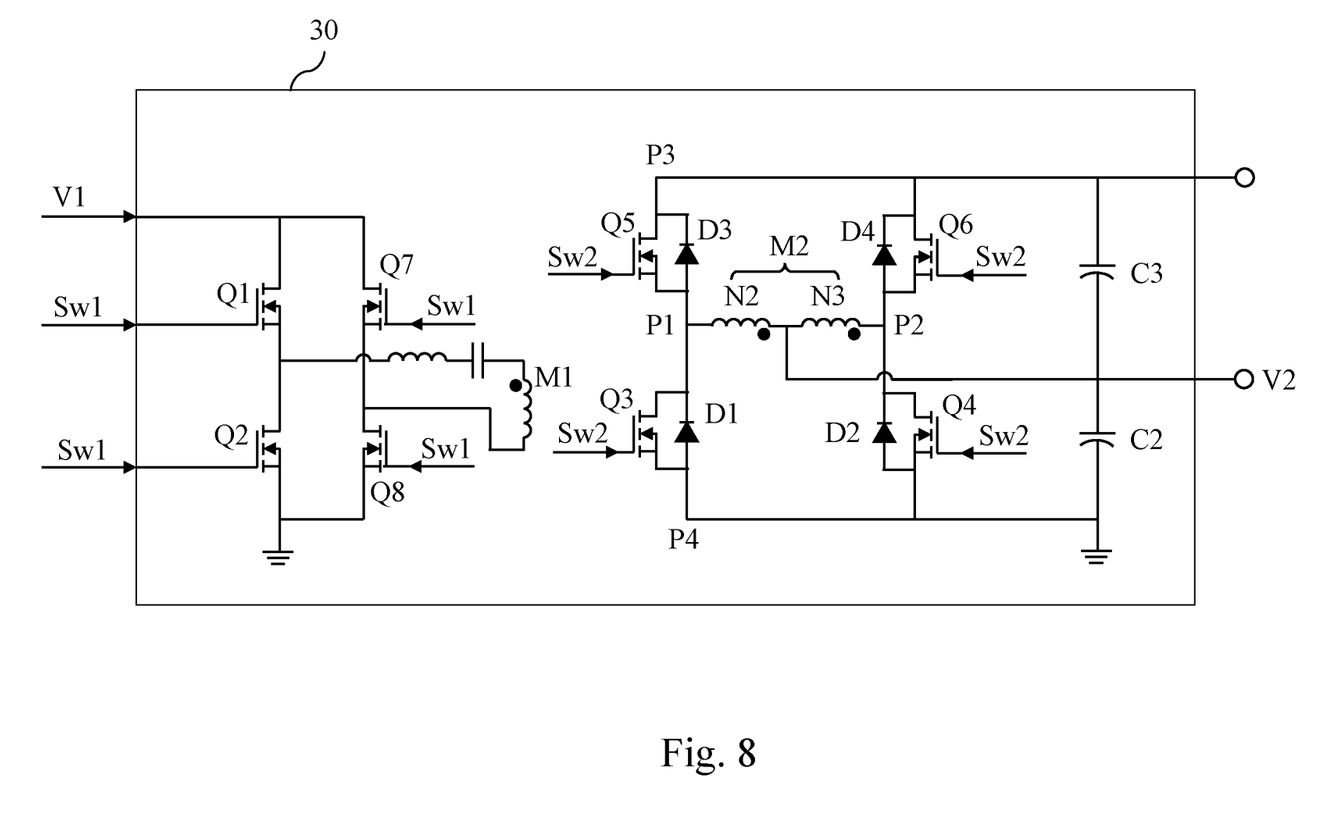
FIG. 8 illustrates a schematic diagram of a voltage conversion circuit according to another exemplary embodiment of the instant disclosure.

The switching of the operation mode between the half-bridge rectification mode and the full-bridge rectification mode illustrated in the above paragraphs happens on the secondary side circuit. Please refer to FIG. 8. FIG. 8 illustrates a schematic diagram of the voltage conversion circuit 30 according to another exemplary embodiment of the instant disclosure. Compared with the previous exemplary embodiment, the operation mode of the primary side circuit in this exemplary embodiment can also be switched between a half-bridge resonance mode and a full-bridge resonance mode. In this exemplary embodiment, the primary side circuit further comprises a seventh switch Q7 and an eighth switch Q8, which are connected to each other in series. The seventh switch Q7 and the eighth switch Q8 are also controlled through the first switching control signal Sw1. One end of the seventh switch Q7 is coupled to the first switch Q1, and one end of the eighth switch Q8 is coupled to the second switch Q2. In the half-bridge resonance mode, the seventh switch Q7 is turned off, and the eighth switch Q8 is turned on, and thus the primary side circuit can operate identically to the previous exemplary embodiment. In the full-bridge resonance mode, the operations of the first switch Q1, the second switch Q2, the seventh switch Q7, and the eighth switch Q8 are all controlled by the first switching control signal Sw1, and thus doubled gain compared with the half-bridge resonance mode can be obtained. As a result, depending on the demand voltage corresponding to the voltage demand signal Sv, beside adjusting the first voltage V1 outputted by the boost converter 20 and/or switching the operation mode of the secondary side circuit to the half-bridge rectification mode or the full-bridge rectification mode as previously illustrated, the operation mode of the primary side circuit can also be switched to the full-bridge resonance mode, so that the output voltage can be adjusted with the further doubled gain.

The aforementioned control units such as the feedback controller 40, the primary side controller 50, and the secondary side controller 60 can be implemented using software, hardware, and/or firmware. For example, if execution speed and precision are the priorities in the design, the control units may be implemented mainly using hardware and/or firmware; if design flexibility is the priority, the control units can be implemented mainly using software. Alternatively, in some embodiments, software, hardware, and firmware may cooperate to implement the control units.

In some exemplary embodiments, the feedback controller 40, the primary side controller 50, and the secondary side controller 60 may be integrated into a single control unit.

In some exemplary embodiments, the switches Q1-Q8 are implemented using N-type metal-oxide-semiconductor field-effect transistors (NMOSFETs), but the instant disclosure is not limited thereto.

Figure 9:
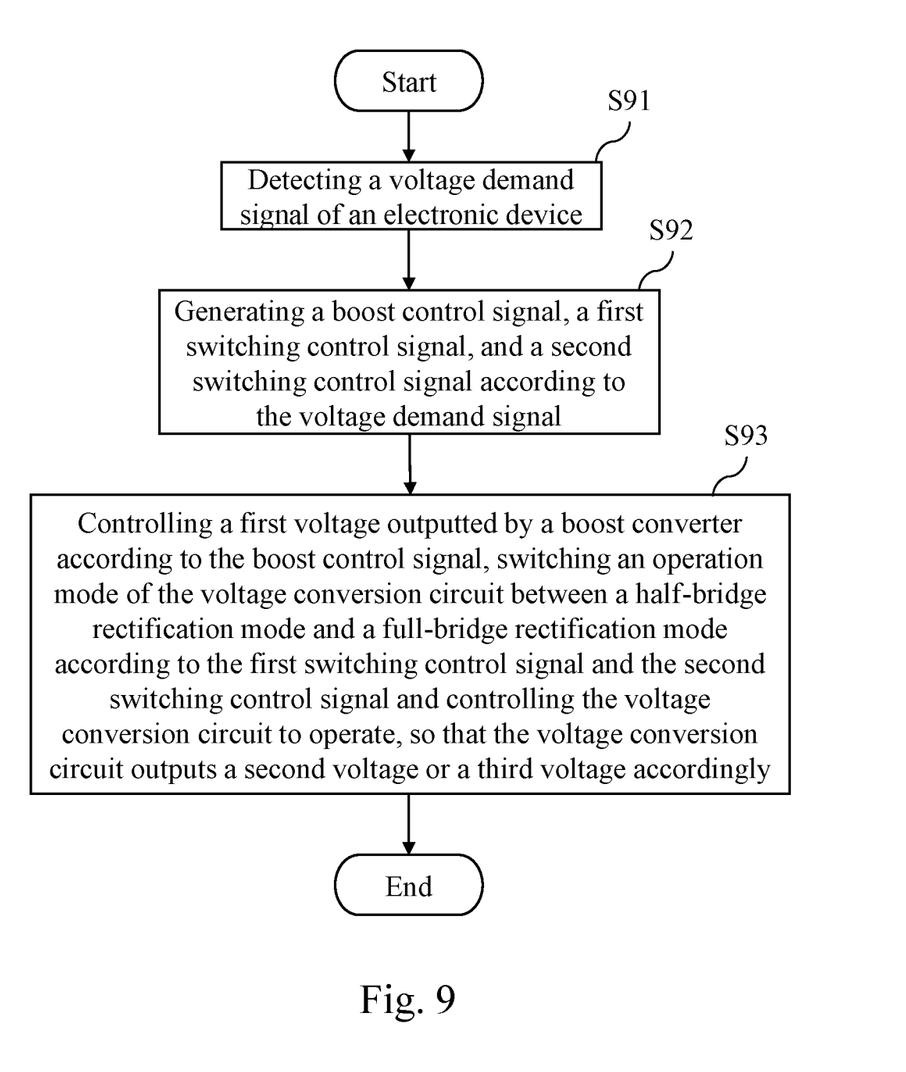
FIG. 9 illustrates a schematic flowchart of a control method for voltage conversion according to an exemplary embodiment of the instant disclosure.

Please refer to FIG. 9. FIG. 9 illustrates a schematic flowchart of a control method for voltage conversion according to an exemplary embodiment of the instant disclosure. The control method is executed by the feedback controller 40, the primary side controller 50, and the secondary side controller 60, which have been previously illustrated, in cooperation. First, the voltage demand signal Sv of the electronic device 2 is detected (step S91). Next, the boost control signal Sb, the first switching control signal Sw1, and the second switching control signal Sw2 are generated according to the voltage demand signal Sv (step S92). Then, the first voltage V1 outputted by the boost converter 20 is controlled according to the boost control signal Sb, the operation mode of the voltage conversion circuit 30 is switched to the half-bridge rectification mode or the full-bridge rectification mode according to the first switching control signal Sw1 and the second switching control signal Sw2, and the voltage conversion circuit 30 is controlled to operate so as to output the second voltage V2 or the third voltage V3 accordingly to meet the demand voltage of the electronic device 2 (step S93).

The elements, steps, and technical features according to the aforementioned embodiments may be combined with one another, and the instant disclosure is not limited to the sequence of the illustration or the sequence of the figures.

As above, according to some exemplary embodiments of the instant disclosure, the voltage converter 1 is able to control the first voltage V1 outputted by the boost converter 20 according to the demand voltage of the electronic device 1, and the voltage converter 1 is able to control the operation mode of the secondary side circuit of the voltage conversion circuit 30 between the half-bridge rectification mode and the full-bridge rectification mode, so that the first voltage V1 is converted into the second voltage V2 or the third voltage V3. When the demand voltage is larger, through the high gain of the full-bridge rectification mode, the output voltage of the forestage boost converter 20 is not needed to be boosted too much. Furthermore, the output voltage can be adjusted by switching the operation mode of the primary side circuit of the voltage conversion circuit 30 between the half-bridge resonance mode and the full-bridge resonance mode. As a result, variability of the output voltage can be achieved through simple control. At the same time, because basic circuit structures are adopted in the design of the voltage converter 1, large-scale circuitry modification is not needed for specific applications, the cost of possible modifications is low, and it is beneficial for miniaturization of relative products.

What is claimed is:

1. A voltage converter comprising:
a feedback controller configured to receive a voltage demand signal from an output end so as to output a first feedback signal and a second feedback signal according to the voltage demand signal;
a primary side controller coupled to the feedback controller, wherein the primary side controller is configured to generate a boost control signal and a first switching control signal according to the first feedback signal;
a secondary side controller coupled to the feedback controller, wherein the secondary side controller is configured to generate a second switching control signal according to the second feedback signal;
a primary side rectification filtration circuit configured to receive an AC voltage and rectify the AC voltage into a DC voltage;
a boost converter coupled to the primary side rectification filtration circuit and the primary side controller, wherein the boost converter is configured to boost the DC voltage into a first voltage according to the boost control signal; and
a voltage conversion circuit coupled to the boost converter, the primary side controller, and the secondary side controller, wherein an operation mode of the voltage conversion circuit is switched between a half-bridge rectification mode and a full-bridge rectification mode according to the first switching control signal and the second switching control signal, so that the voltage conversion circuit converts the first voltage into a second voltage in the half-bridge rectification mode or converts the first voltage into a third voltage in the full-bridge rectification mode, and the voltage conversion circuit outputs the second voltage or the third voltage through the output end,
wherein the voltage conversion circuit comprises:
a primary side circuit comprising a first switch, a second switch, an inductor, and a first capacitor, wherein the first switch and the second switch are connected to each other in series, one of two ends of the inductor is coupled between the first switch and the second switch, and one of two ends of the first capacitor is coupled to the second switch;
a secondary side circuit comprising a bridge rectifier, a third switch, a fourth switch, a fifth switch, and a sixth switch, wherein the bridge rectifier comprises four diodes which are sequentially connected to each other in series so as to form a closed path, the bridge rectifier is divided into an upper half-bridge path and a lower half-bridge path by two input nodes, two of the diodes on the lower half-bridge path are connected to the third switch and the fourth switch in parallel, respectively, and two of the diodes on the upper half-bridge path are connected to the fifth switch and the sixth switch in parallel, respectively; and
a transformer comprising a primary winding and a secondary winding, wherein the primary winding is coupled to the inductor and the first capacitor, and the secondary winding is coupled between the two input nodes, and
wherein in response to that the voltage conversion circuit is in the half-bridge rectification mode, according to the first switching control signal and the second switching control signal, the fifth switch and the sixth switch are turned off, the first switch and the third switch are turned on, and the second switch and the fourth switch are turned off, so that a positive half cycle current travels through the voltage conversion circuit and charges the first capacitor.

2. The voltage converter according to claim 1, wherein an amplitude of the third voltage is twice an amplitude of the second voltage.

3. The voltage converter according to claim 1, wherein the secondary winding comprises a central tap so that the second voltage is outputted through the central tap in the half-bridge rectification mode.

4. The voltage converter according to claim 3, wherein the secondary side circuit further comprises two filtration capacitors connected to each other in series and coupled between two output nodes of the bridge rectifier, and the central tap is coupled between the two filtration capacitors.

5. The voltage converter according to claim 3, wherein the secondary winding is divided into a first coil and a second coil by the central tap, and in response to that the voltage conversion circuit is in the half-bridge rectification mode, the positive half cycle current travels through the first coil, and a negative half cycle current travels through the second coil.

6. The voltage converter according to claim 1, wherein the secondary winding comprises a central tap, and the secondary winding is divided into a first coil and a second coil by the central tap; in response to that the voltage conversion circuit is in the full-bridge rectification mode, the positive half cycle current travels through the first coil and the second coil, and a negative half cycle current travels through the first coil and the second coil.

7. A voltage converter comprising:
- a feedback controller configured to receive a voltage demand signal from an output end so as to output a first feedback signal and a second feedback signal according to the voltage demand signal;
- a primary side controller coupled to the feedback controller, wherein the primary side controller is configured to generate a boost control signal and a first switching control signal according to the first feedback signal;
- a secondary side controller coupled to the feedback controller, wherein the secondary side controller is configured to generate a second switching control signal according to the second feedback signal;
- a primary side rectification filtration circuit configured to receive an AC voltage and rectify the AC voltage into a DC voltage;
- a boost converter coupled to the primary side rectification filtration circuit and the primary side controller, wherein the boost converter is configured to boost the DC voltage into a first voltage according to the boost control signal; and
- a voltage conversion circuit coupled to the boost converter, the primary side controller, and the secondary side controller, wherein an operation mode of the voltage conversion circuit is switched between a half-bridge rectification mode and a full-bridge rectification mode according to the first switching control signal and the second switching control signal, so that the voltage conversion circuit converts the first voltage into a second voltage in the half-bridge rectification mode or converts the first voltage into a third voltage in the full-bridge rectification mode, and the voltage conversion circuit outputs the second voltage or the third voltage through the output end, wherein the voltage conversion circuit comprises:
- a primary side circuit comprising a first switch, a second switch, an inductor, and a first capacitor, wherein the first switch and the second switch are connected to each other in series, one of two ends of the inductor is coupled between the first switch and the second switch, and one of two ends of the first capacitor is coupled to the second switch;
- a secondary side circuit comprising a bridge rectifier, a third switch, a fourth switch, a fifth switch, and a sixth switch, wherein the bridge rectifier comprises four diodes which are sequentially connected to each other in series so as to form a closed path, the bridge rectifier is divided into an upper half-bridge path and a lower half-bridge path by two input nodes, two of the diodes on the lower half-bridge path are connected to the third switch and the fourth switch in parallel, respectively, and two of the diodes on the upper half-bridge path are connected to the fifth switch and the sixth switch in parallel, respectively; and
- a transformer comprising a primary winding and a secondary winding, wherein the primary winding is coupled to the inductor and the first capacitor, and the secondary winding is coupled between the two input nodes, and wherein in response to that the voltage conversion circuit is in the half-bridge rectification mode, according to the first switching control signal and the second switching control signal, the fifth switch and the sixth switch are turned off, the second switch and the fourth switch are turned on, and the first switch and the third switch are turned off, so that a negative half cycle current travels through the voltage conversion circuit and discharges the first capacitor.

8. A voltage converter comprising:
- a feedback controller configured to receive a voltage demand signal from an output end so as to output a first feedback signal and a second feedback signal according to the voltage demand signal;
- a primary side controller coupled to the feedback controller, wherein the primary side controller is configured to generate a boost control signal and a first switching control signal according to the first feedback signal;
- a secondary side controller coupled to the feedback controller, wherein the secondary side controller is configured to generate a second switching control signal according to the second feedback signal;
- a primary side rectification filtration circuit configured to receive an AC voltage and rectify the AC voltage into a DC voltage;
- a boost converter coupled to the primary side rectification filtration circuit and the primary side controller, wherein the boost converter is configured to boost the DC voltage into a first voltage according to the boost control signal; and
- a voltage conversion circuit coupled to the boost converter, the primary side controller, and the secondary side controller, wherein an operation mode of the voltage conversion circuit is switched between a half-bridge rectification mode and a full-bridge rectification mode according to the first switching control signal and the second switching control signal, so that the voltage conversion circuit converts the first voltage into a second voltage in the half-bridge rectification mode or converts the first voltage into a third voltage in the full-bridge rectification mode, and the voltage conversion circuit outputs the second voltage or the third voltage through the output end, wherein the voltage conversion circuit comprises:
- a primary side circuit comprising a first switch, a second switch, an inductor, and a first capacitor, wherein the first switch and the second switch are connected to each other in series, one of two ends of the inductor is coupled between the first switch and the second switch, and one of two ends of the first capacitor is coupled to the second switch;
- a secondary side circuit comprising a bridge rectifier, a third switch, a fourth switch, a fifth switch, and a sixth switch, wherein the bridge rectifier comprises four diodes which are sequentially connected to each other in series so as to form a closed path, the bridge rectifier is divided into an upper half-bridge path and a lower half-bridge path by two input nodes, two of the diodes on the lower half-bridge path are connected to the third switch and the fourth switch in parallel, respectively, and two of the diodes on the upper half-bridge path are connected to the fifth switch and the sixth switch in parallel, respectively; and a transformer comprising a primary winding and a secondary winding, wherein the primary winding is coupled to the inductor and the first capacitor, and the secondary winding is coupled between the two input nodes, and wherein in response to that the voltage conversion circuit is in the full-bridge rectification mode, according to the first switching control signal and the second switching control signal, the first switch, the third switch, and the sixth switch are turned on, and the second switch, the fourth switch, and the fifth switch are turned off, so that a positive half cycle current travels through the voltage conversion circuit.

9. A voltage converter comprising:
a feedback controller configured to receive a voltage demand signal from an output end so as to output a first feedback signal and a second feedback signal according to the voltage demand signal;
a primary side controller coupled to the feedback controller, wherein the primary side controller is configured to generate a boost control signal and a first switching control signal according to the first feedback signal;
a secondary side controller coupled to the feedback controller, wherein the secondary side controller is configured to generate a second switching control signal according to the second feedback signal;
a primary side rectification filtration circuit configured to receive an AC voltage and rectify the AC voltage into a DC voltage;
a boost converter coupled to the primary side rectification filtration circuit and the primary side controller, wherein the boost converter is configured to boost the DC voltage into a first voltage according to the boost control signal; and
a voltage conversion circuit coupled to the boost converter, the primary side controller, and the secondary side controller, wherein an operation mode of the voltage conversion circuit is switched between a half-bridge rectification mode and a full-bridge rectification mode according to the first switching control signal and the second switching control signal, so that the voltage conversion circuit converts the first voltage into a second voltage in the half-bridge rectification mode or converts the first voltage into a third voltage in the full-bridge rectification mode, and the voltage conversion circuit outputs the second voltage or the third voltage through the output end, wherein the voltage conversion circuit comprises:
a primary side circuit comprising a first switch, a second switch, an inductor, and a first capacitor, wherein the first switch and the second switch are connected to each other in series, one of two ends of the inductor is coupled between the first switch and the second switch, and one of two ends of the first capacitor is coupled to the second switch;

a secondary side circuit comprising a bridge rectifier, a third switch, a fourth switch, a fifth switch, and a sixth switch, wherein the bridge rectifier comprises four diodes which are sequentially connected to each other in series so as to form a closed path, the bridge rectifier is divided into an upper half-bridge path and a lower half-bridge path by two input nodes, two of the diodes on the lower half-bridge path are connected to the third switch and the fourth switch in parallel, respectively, and two of the diodes on the upper half-bridge path are connected to the fifth switch and the sixth switch in parallel, respectively; and a transformer comprising a primary winding and a secondary winding, wherein the primary winding is coupled to the inductor and the first capacitor, and the secondary winding is coupled between the two input nodes, and wherein in response to that the voltage conversion circuit is in the full-bridge rectification mode, according to the first switching control signal and the second switching control signal, the first switch, the third switch, and the sixth switch are turned off, and the second switch, the fourth switch, and the fifth switch are turned on, so that a negative half cycle current travels through the voltage conversion circuit.

10. A control method for voltage conversion comprising:
detecting a voltage demand signal of an electronic device;
generating a boost control signal, a first switching control signal, and a second switching control signal according to the voltage demand signal;
controlling a first voltage outputted by a boost converter according to the boost control signal, wherein the first voltage is outputted to a voltage conversion circuit; and
switching an operation mode of the voltage conversion circuit between a half-bridge rectification mode and a full-bridge rectification mode according to the first switching control signal and the second switching control signal, and controlling the voltage conversion circuit to operate, so that the first voltage is converted into a second voltage in the half-bridge rectification mode, and the first voltage is converted into a third voltage in the full-bridge rectification mod;

wherein the voltage conversion circuit comprises:
a primary side circuit comprising a first switch, a second switch, an inductor, and a first capacitor, wherein the first switch and the second switch are connected to each other in series, one of two ends of the inductor is coupled between the first switch and the second switch, and one of two ends of the first capacitor is coupled to the second switch;
a secondary side circuit comprising a bridge rectifier, a third switch, a fourth switch, a fifth switch, and a sixth switch, wherein the bridge rectifier comprises four diodes which are sequentially connected to each other in series so as to form a closed path, the bridge rectifier is divided into an upper half-bridge path and a lower half-bridge path by two input nodes, two of the diodes on the lower half-bridge path are connected to the third switch and the fourth switch in parallel, respectively, and two of the diodes on the upper half-bridge path are connected to the fifth switch and the sixth switch in parallel, respectively; and
a transformer comprising a primary winding and a secondary winding, wherein the primary winding is coupled to the inductor and the first capacitor, and the secondary winding is coupled between the two input nodes, and wherein in response to that the voltage conversion circuit is in the half-bridge rectification mode, according to the first switching control signal and the second switching control signal, the fifth switch and the sixth switch are turned off, the first switch and the third switch are turned on, and the second switch and the fourth switch are turned off, so that a positive half cycle current travels through the voltage conversion circuit and charges the first capacitor.

11. The control method according to claim 10, wherein an amplitude of the third voltage is twice an amplitude of the second voltage.

12. The control method according to claim 10, wherein the transformer is between the primary side circuit and the secondary side circuit.

13. The control method according to claim 12, wherein the secondary winding of the transformer comprises a central tap, and the second voltage is outputted through the central tap.

14. The control method according to claim 13, wherein the secondary winding is divided into a first coil and a second coil by the central tap; in response to that the voltage conversion circuit is in the half-bridge rectification mode, the positive half cycle current travels through the first coil, and a negative half cycle current travels through the second coil.

15. The control method according to claim 10, wherein the transformer is between the primary side circuit and the secondary side circuit, the secondary winding of the transformer comprises a central tap, the secondary winding is divided into a first coil and a second coil by the central tap; in response to that the voltage conversion circuit is in the full-bridge rectification mode, the positive half cycle current travels through the first coil and the second coil, and a negative half cycle current travels through the first coil and the second coil.

16. A control method for voltage conversion comprising:
detecting a voltage demand signal of an electronic device;
generating a boost control signal, a first switching control signal, and a second switching control signal according to the voltage demand signal;
controlling a first voltage outputted by a boost converter according to the boost control signal, wherein the first voltage is outputted to a voltage conversion circuit; and
switching an operation mode of the voltage conversion circuit between a half-bridge rectification mode and a full-bridge rectification mode according to the first switching control signal and the second switching control signal, and controlling the voltage conversion circuit to operate, so that the first voltage is converted into a second voltage in the half-bridge rectification mode, and the first voltage is converted into a third voltage in the full-bridge rectification mode,
wherein the voltage conversion circuit comprises:
a primary side circuit comprising a first switch, a second switch, an inductor, and a first capacitor, wherein the first switch and the second switch are connected to each other in series, one of two ends of the inductor is coupled between the first switch and the second switch, and one of two ends of the first capacitor is coupled to the second switch;
a secondary side circuit comprising a bridge rectifier, a third switch, a fourth switch, a fifth switch, and a sixth switch, wherein the bridge rectifier comprises four diodes which are sequentially connected to each other in series so as to form a closed path, the bridge rectifier is divided into an upper half-bridge path and a lower half-bridge path by two input nodes, two of the diodes on the lower half-bridge path are connected to the third switch and the fourth switch in parallel, respectively, and two of the diodes on the upper half-bridge path are connected to the fifth switch and the sixth switch in parallel, respectively; and
a transformer comprising a primary winding and a secondary winding, wherein the primary winding is coupled to the inductor and the first capacitor, and the secondary winding is coupled between the two input nodes, and
wherein in response to that the voltage conversion circuit is in the half-bridge rectification mode, according to the first switching control signal and the second switching control signal, the fifth switch and the sixth switch are turned off, the second switch and the fourth switch are turned on, and the first switch and the third switch are turned off, so that a negative half cycle current travels through the voltage conversion circuit and discharges the first capacitor.

17. A control method for voltage conversion comprising:
detecting a voltage demand signal of an electronic device;
generating a boost control signal, a first switching control signal, and a second switching control signal according to the voltage demand signal;
controlling a first voltage outputted by a boost converter according to the boost control signal, wherein the first voltage is outputted to a voltage conversion circuit; and
switching an operation mode of the voltage conversion circuit between a half-bridge rectification mode and a full-bridge rectification mode according to the first switching control signal and the second switching control signal, and controlling the voltage conversion circuit to operate, so that the first voltage is converted into a second voltage in the half-bridge rectification mode, and the first voltage is converted into a third voltage in the full-bridge rectification mode,
wherein the voltage conversion circuit comprises:
a primary side circuit comprising a first switch, a second switch, an inductor, and a first capacitor, wherein the first switch and the second switch are connected to each other in series, one of two ends of the inductor is coupled between the first switch and the second switch, and one of two ends of the first capacitor is coupled to the second switch;
a secondary side circuit comprising a bridge rectifier, a third switch, a fourth switch, a fifth switch, and a sixth switch, wherein the bridge rectifier comprises four diodes which are sequentially connected to each other in series so as to form a closed path, the bridge rectifier is divided into an upper half-bridge path and a lower half-bridge path by two input nodes, two of the diodes on the lower half-bridge path are connected to the third switch and the fourth switch in parallel, respectively, and two of the diodes on the upper half-bridge path are connected to the fifth switch and the sixth switch in parallel, respectively; and
a transformer comprising a primary winding and a secondary winding, wherein the primary winding is coupled to the inductor and the first capacitor, and the secondary winding is coupled between the two input nodes, and
wherein in response to that the voltage conversion circuit is in the full-bridge rectification mode, according to the first switching control signal and the second switching control signal, the first switch, the third switch, and the sixth switch are turned on, and the second switch, the fourth switch, and the fifth switch are turned off, so that a positive half cycle current travels through the voltage conversion circuit.

18. A control method for voltage conversion comprising:

detecting a voltage demand signal of an electronic device;

generating a boost control signal, a first switching control signal, and a second switching control signal according to the voltage demand signal;

controlling a first voltage outputted by a boost converter according to the boost control signal, wherein the first voltage is outputted to a voltage conversion circuit; and switching an operation mode of the voltage conversion circuit between a half-bridge rectification mode and a full-bridge rectification mode according to the first switching control signal and the second switching control signal, and controlling the voltage conversion circuit to operate, so that the first voltage is converted into a second voltage in the half-bridge rectification mode, and the first voltage is converted into a third voltage in the full-bridge rectification mode, wherein the voltage conversion circuit comprises:

a primary side circuit comprising a first switch, a second switch, an inductor, and a first capacitor, wherein the first switch and the second switch are connected to each other in series, one of two ends of the inductor is coupled between the first switch and the second switch, and one of two ends of the first capacitor is coupled to the second switch;

a secondary side circuit comprising a bridge rectifier, a third switch, a fourth switch, a fifth switch, and a sixth switch, wherein the bridge rectifier comprises four diodes which are sequentially connected to each other in series so as to form a closed path, the bridge rectifier is divided into an upper half-bridge path and a lower half-bridge path by two input nodes, two of the diodes on the lower half-bridge path are connected to the third switch and the fourth switch in parallel, respectively, and two of the diodes on the upper half-bridge path are connected to the fifth switch and the sixth switch in parallel, respectively; and a transformer comprising a primary winding and a secondary winding, wherein the primary winding is coupled to the inductor and the first capacitor, and the secondary winding is coupled between the two input nodes, and wherein in response to that the voltage conversion circuit is in the full-bridge rectification mode, according to the first switching control signal and the second switching control signal, the first switch, the third switch, and the sixth switch are turned off, and the second switch, the fourth switch, and the fifth switch are turned on, so that a negative half cycle current travels through the voltage conversion circuit.

* * * * *